Dec. 10, 1957

R. L. ZIMMERMAN 2,816,240

HIGH SPEED COMPOSITE ELECTRO-MAGNET
AND PERMANENT MAGNET GENERATOR

Filed March 9, 1956

ROBERT L. ZIMMERMAN
INVENTOR.

BY Nicholas T. Volv

ATTORNEY.

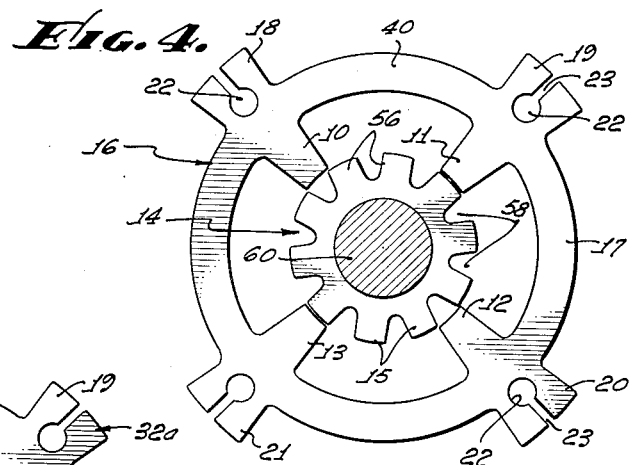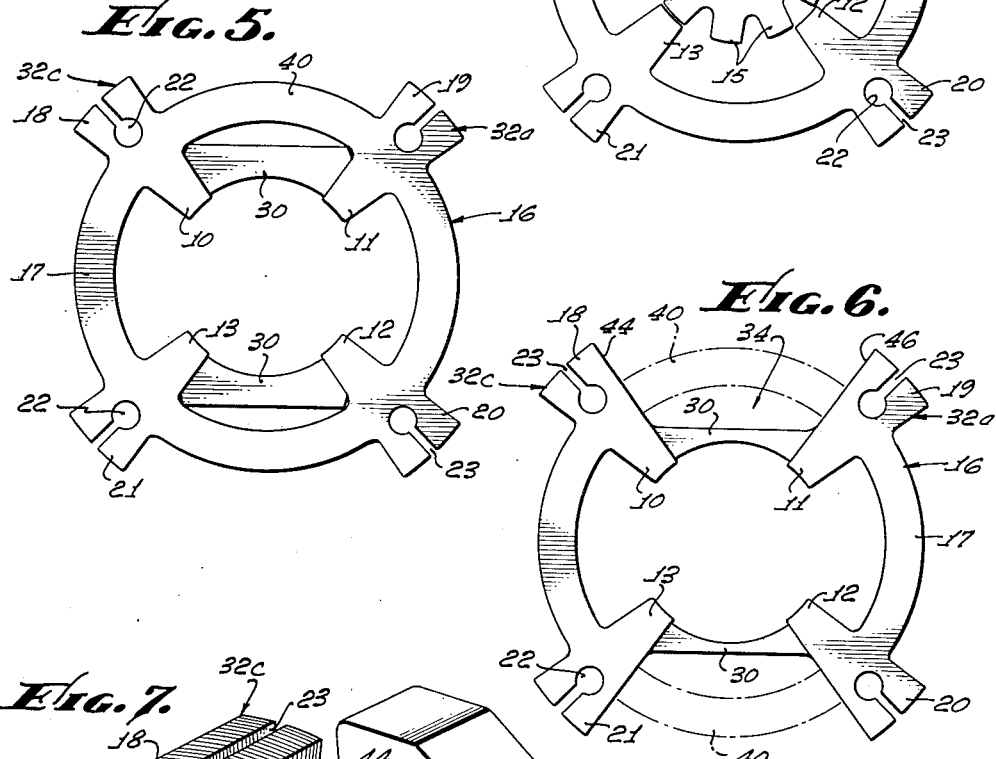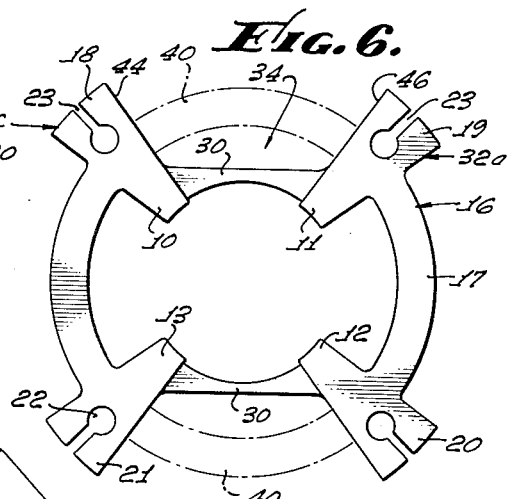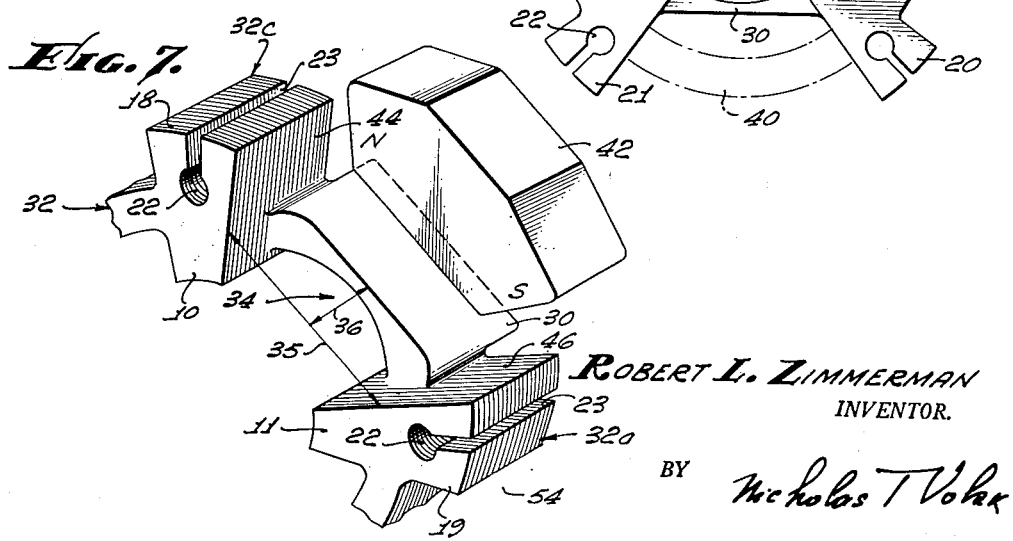

Dec. 10, 1957  R. L. ZIMMERMAN  2,816,240
HIGH SPEED COMPOSITE ELECTRO-MAGNET
AND PERMANENT MAGNET GENERATOR
Filed March 9, 1956  3 Sheets-Sheet 3

ROBERT L. ZIMMERMAN
INVENTOR.

BY
Nicholas T Voha
ATTORNEY.

United States Patent Office 2,816,240
Patented Dec. 10, 1957

2,816,240

HIGH SPEED COMPOSITE ELECTRO-MAGNET AND PERMANENT MAGNET GENERATOR

Robert L. Zimmerman, Northridge, Calif., assignor to American Machine and Foundry Company, a corporation of New Jersey Application March 9, 1956, Serial No. 570,559

7 Claims. (Cl. 310—155)

This invention relates to alternating current generators and more particularly to the alternating current compound generators combining in one generator a permanent magnet stator for providing positive excitation by the permanent magnets for armature windings, and an electro-magnetically excited stator having field coils connected to the output of the generator through a control circuit which provides a control excitation to the field coils for maintaining constant the terminal voltage of the generator even though there is a variation in external load connected to the generator.

Known improvements in permanent magnet materials having a high available energy have extended the field of applications, or uses, of permanent magnet generators. The most widely used permanent magnet materials are alloys of aluminum, nickel, cobalt, copper and iron which are known in industry as "Alnico" alloys. These alloys are characterized by coercive forces of 400–700 oersteds, residual inductions of 6,500–12,500 gausses, and available energy values of the order of $4.5 \times 10^6$ ergs. These high energy values make such materials suitable for providing positive excitation for alternating current generators. Alternators of this type are disclosed in the United States Patents 2,632,123; 2,810,844 and a large number of additional patents listed in the above mentioned patents.

One of the limitations of permanent magnet generators resides in the method of regulating an output voltage of such generators. In some permanent magnet generators, the output voltage is controlled by varying the reluctance of the magnetic circuit of the permanent magnets. Such variation in the reluctance is obtained by varying the air-gap of a shunt reluctance. Since such shunt reluctance includes mechanical elements, the voltage regulation is a function of the mechanical inertia of such shunt reluctance. In order to avoid the limitations imposed by the variable reluctance voltage regulation systems, some of the generators combine permanent magnet excitation with the electro-magnetic excitation, the current flowing through the field windings being adjusted by means of known external voltage control circuits. Such generator is disclosed in the United States Patent 2,540,202. The generators disclosed in the latter patent are inductor alternators whose flux change is dependent on the air gap reluctance and, therefore, no reversal of flux takes place through armature windings in such generators. Accordingly, the generators of the above type have a limited output or power per pound of weight of the generator because of the limited flux modulation, or flux change, possible with such machines. For equivalent geometry, the flux-commutation or flux-reversing generators disclosed by this invention will provide four times the power provided by the inductor alternators where the flux change is dependent on the air gap reluctance. An additional limitation of such machines resides in the fact that the permanent magnet material consists of laminations, or punchings, of permanent magnet steel which has very low energy levels as compared to "Alnico" materials. Moreover, the field windings in such machines surround the permanent magnet material, which offers high reluctance, and therefore, such machines require a relatively high field winding current and correspondingly large changes in this current for maintaining the terminal voltage of alternator constant. However, a more important consideration resides in the inability of such machines to have high residual voltage because of the low energy level of the steel stampings; this in turn requires a larger field current through the field windings, and higher wattage voltage control circuits. For example, while "Alnico V" has an energy value of the order of $4.5 \times 10^6$ ergs per cubic centimeter, the highest energy value obtainable with permanent magnet steels is of the order of $0.26 \times 10^6$ ergs per cubic centimeter.

The invention discloses a composite generator in which the stator has two sets of circular laminations of iron-silicon alloy having high permeability. One set of laminations has two angular segments, which may be of the order of 70°, removed, or punched out, from the laminations and a permanent magnet inserted into each gap thus formed in the laminations. The gaps are symmetrically disposed around the periphery of the resulting structure and with respect to the diameter of the laminations. The two permanent magnets are oriented, or placed, into the gaps so as to make the like poles face each other through the remaining lamination segments. Thus the flux of one magnet opposes the flux of the other magnet and the north poles of the magnets make contact with the opposite ends of the same set of lamination segments. The same is true of the south poles of the magnets, which make direct contact with the second segment of the laminations. Accordingly, equipotential magnetic energy levels, one of the north polarity and the second of the south polarity, are created in two lamination segments which interconnect the two magnets. The above structure constitutes the permanent magnet portion of the stator structure. The second portion of the stator includes the second stack of identical silicon steel laminations which do not have any air gaps and are circular laminations extending throughout the 360°. Two field windings are mounted on the second stack of laminations which occupy the same angular positions as the permanent magnets on the first permanent magnet portion of the stator. The two stator portions are adjacent to each other in the transverse direction, and two armature windings surround the two lamination stacks. The stator laminations are provided with four stator poles, each pole being positioned 90° away from the other around the circumference of the rotor. The stator poles are positioned between the field windings and the armature windings. A flux-reversing multi-pole, or multi-tooth, rotor is mounted on a shaft. The rotor acts as a flux-reversing switch for the flux passing through the armature windings when the successive teeth of the rotor are in alignment with the successive poles of the stator. A complete reversal of the total flux created by the permanent magnets and by the field windings is obtained. Accordingly, the power of the generator is determined by the following relationship:

$$P \alpha \cdot B^2 \qquad (1)$$

where P is power in watts; B is the total flux, in lines per square centimeter, produced by the permanent magnets and the field coils in the poles of the stator.

The above power rating is at least four times the power rating obtainable with the theoretically perfect inductor generators such as the Alexanderson machine and other generators utilizing flux modulation by varying the reluctance of the air gap but without producing any flux reversal. In practice, the inductor generators are seldom theoretically perfect and therefore the difference in the power ratings of the two generators actually is much greater than four to one. It may be as high as eight to one. It should be noted that the number of the stator poles and the rotor teeth may be varied and still produce complete flux reversal. The minimum number of poles is four, and the minimum number of rotor teeth is two. The optimum number of the rotor teeth with a four-pole machine is 10.

It is therefore, an object of this invention to provide a composite alternating current generator having a composite stator which includes a permanent magnet stator portion with high energy level permanent magnets magnetically opposing each other, and an electro-magnetic portion including a field winding or windings, armature windings surrounding the two portions of the stator, and a flux reversing rotor surrounded by the stator, the rotor reversing the flux passing through the armature windings as it rotates with respect to the stator.

It is an additional object of this invention to provide a generator having low specific weight, i. e., watts output per unit weight of the generator, having a composite stator with permanent magnet portion using high energy permanent magnet material in combination with high permeability ferro-magnetic material, and an electro-magnetic portion including field coils connected to an external high sensitivity control circuit for maintaining the terminal voltage of the generator constant, and a flux-reversing rotor made of high permeability steel laminations which permit the rotation of the rotor at such high angular speeds as 40,000–60,000 revolutions per minute.

Still another object of this invention is to provide an alternating current generator having a composite stator, a multi-tooth rotor capable of providing flux reversal through armature windings mounted on the stator, and possessing the following additional characteristics; high residual flux provided by high energy permanent magnet material; low reluctance circuits for field windings; low specific weight; low wattage-high sensitivity electronic control circuits for voltage regulation and fast voltage build-up upon starting of the generator, and a steel rotor capable of withstanding high angular velocities.

The various objects and features of my invention will be fully understood from the following detailed description of a typical preferred form and application of the invention, reference being made throughout the description to the accompanying drawings. It should be understood that the description and the drawings do not constitute the limitations of this invention, the features which are believed to be novel and patentable being defined in the claims. Referring to the drawings:

Figure 4 is a side-view of a typical lamination used for the permanent magnet portion of the generator as well as for the electro-magnetic portion of the generator with the lamination of the rotor being also illustrated as mounted in the center of the stator lamination;

Figure 5 is a side view of a portion of the lamination illustrated in Figure 4 with a non-magnetic segment positioned between the two adjacent stator poles;

Figure 6 is a side view of the lamination segments brazed to two non-magnetic segments;

Figure 7 is a perspective view of a permanent magnet and of a portion of the lamination segments held together by a brazed non-magnetic segment, with a portion of the three segments milled out for receiving a permanent magnet;

Figure 1:
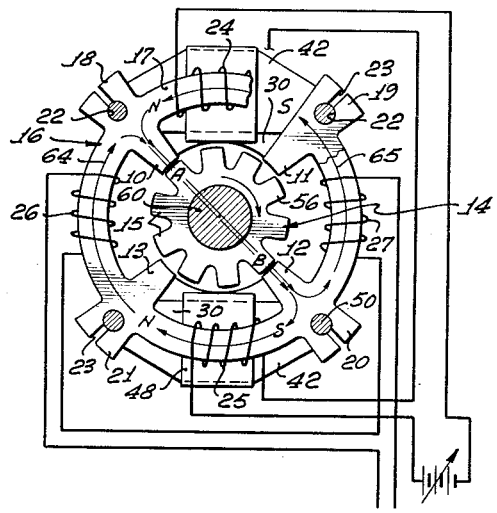
Figures 1 and 2 are side-views of a compound generator with the coils being indicated in a schematic form and the rotor of the generator being positioned in these figures so as to illustrate the flux reversal through the armature windings of the generator.

Referring to the figures, the invention is illustrated with a stator having four poles 10, 11, 12, and 13 which is the minimum number of poles capable of producing the previously mentioned flux reversal with a rotor 14. The illustrated rotor has ten rotor teeth 15 so that the radial center lines of the adjacent rotor teeth are spaced 36° from each other. A larger or smaller number of the rotor teeth can be used but the number of the teeth should be an even number and their peripheral width, preferably, should correspond, or should be equal to, the peripheral width of the stator pole tips 10. When sinusoidal wave is desired, then the pole tips of the stator and the teeth of the rotor can be shaped in known manner to produce such wave. In the illustrated laminations, the resultant wave will be a substantially square wave. The stator lamination 16, illustrated more in detail in Fig. 4, includes a flat ring portion 17, four poles 10—13, and four radial pole extensions 18, 19, 20 and 21, which project beyond the outer circumference of the ring portion 17. The pole extensions 18—21 are provided with holes 22 and slots 23. Holes 22 are used for bolting together the stator laminations of the electro-magnetic portion of the stator to the permanent magnet portion of the stator after the field coils 24 and 25 are wound on the stack of laminations 16, such stacks acting as low reluctance paths for the field windings and the armature windings 26 and 27 of the stator. The electro-magnetic portion of the stator is assembled in the following manner: laminations 16 are painted with a varnish and stacked in a jig with the holes 22 of the laminations being used for aligning the laminations. The stack then is clamped together with an appropriate clamping means, baked and field coils 24 and 25 are wound on the integrated stack. The resulting structure is illustrated in Fig. 8.

The permanent magnet stator assembly is obtained as follows. A stack of laminations is inserted in the same jig used for assembling and bonding the field coil laminations but no varnish is used for bonding the laminations together. In this case, the laminations are bonded together by means of a non-magnetic segment 30 which is brazed to the stack while the stack is held in a clamped position in the jig. A brazing torch or a furnace may be used for brazing the two segments to the lamination stack. After the two segments 30 are brazed to the laminations stacks 32a and 32b, Fig. 7, a portion of the non-magnetic segment is milled out to provide a recess 34 indicated by arrows 35 and 36 in Fig. 7. This recess is used for accommodating the field coils 24 and 25 which project into their respective recesses. The milled out segment provides a very positive means for holding the stack portions 32a and 32b in a fixed position with respect to each other. After the two segments 30 are brazed to the lamination stack 32 the circular or the ring portions 40 of the laminations between the poles 38 and 39 (only one portion 40 is visible in the figure) are milled out, the portions 40 being illustrated in Fig. 6 by dotted lines. This milling out of the lamination portions 40 is necessary for providing room for permanent magnets 42 which are inserted into the gap created between the poles 38 and 39. The permanent magnets 42 are shaped to engage the matching surfaces 44 and 46 of the respective poles. The permanent magnets are surrounded by a copper loop 48 to prevent demagnetization of the permanent magnet due to the armature reaction. Copper loops of the above type are well known in the art and, therefore, need no additional description. The magnets 42 are retained in the gaps by the force of attraction and need no additional clamping means. If so desired, copper loops 48 may be soldered to segments 30.

Figure 2:
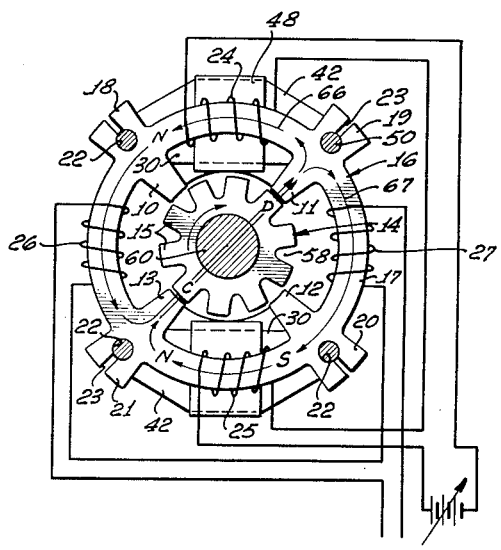

As illustrated in Figs. 1 and 2, two permanent magnets 42 and 44 which are made of "Alnico V" are used in the four-pole machine with the north poles of the magnets facing each other through the low reluctance magnetic circuit provided by the poles and the ring portions 17.

Figure 8:
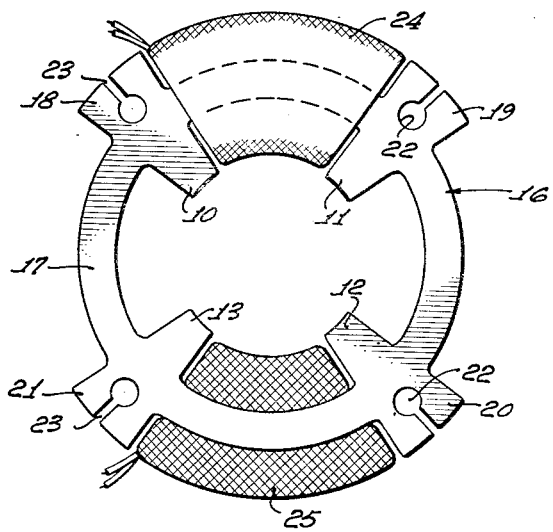
Figure 8 is a plan view of the field coil assembly of the stator.

After the two stator members are assembled in the manner indicated above, they are put together, side-by-side, with the outer surface of the side-lamination 16 of the permanent magnet assembly illustrated in Figs. 6 and 7 placed in direct contact with the matching surface of the side lamination 16 of the electro-magnetic assembly illustrated in Fig. 8. The two assemblies are clamped, or clamped, or bolted, together by means of four bolts 50 illustrated in Figs. 1, 2 and 3, which produces a composite stator structure illustrated in Fig. 3. In one particular example, the transverse dimension of the electromagnetic core, composed of a stack of laminations 16, is of the order of .9", while the permanent magnet portion of the core has a transverse dimension 54 of the order of .6". These dimensions are controlled by the inherent voltage regulation of the machine and the type of load connected to the machine. The smaller is the percentage of regulation required of the machine, the larger is the electro-magnetic portion of the machine i. e., the larger is the dimension 52 as compared to dimension 54.

Figure 3:
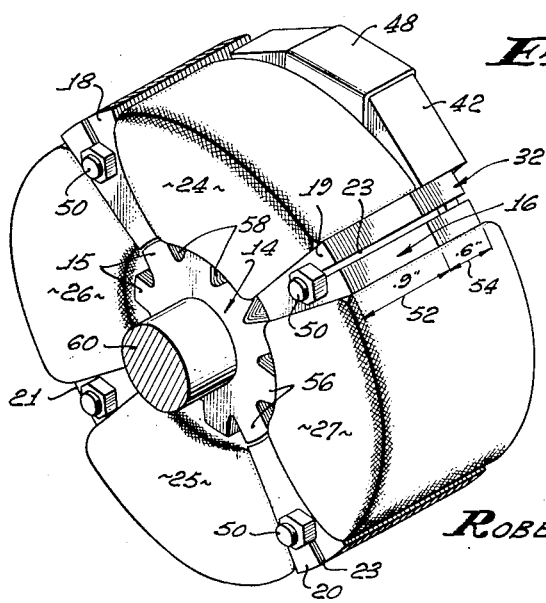
Figure 3 is a perspective view of the alternator with the external leads being omitted for simplifying the drawing.

The rotor of the alternator is illustrated in Figs. 1, 2, 3, and 4. Figures 1, 2 and 4 illustrate a sideview of the rotor, while Fig. 3 illustrates a perspective view of the rotor mounted in proper rotational relationship with respect to the stator. The illustrated rotor has ten rotor teeth 56 and ten rotor gaps 58. The peripheral dimensions of the rotor teeth, or their peripheral width is made equal to the same width of the inner tips of the poles 10—13, as illustrated in Figs. 1, 2 and 4. The peripheral dimension of the gaps 58 is also equal to the above dimensions of the pole tips 10—13 and of the rotor teeth 56. With the rotor being dimensioned in this manner, the rotor, when rotated on a shaft 60, acts as a flux reversing switch or a flux reversing rotor, in the manner illustrated in Figs. 1 and 2. When the rotor teeth A and B are aligned with the poles 10 and 12 in the manner illustrated on Fig. 1, the rotor acts as a very low reluctance path for the flux produced by the permanent magnets 42 and 44, the direction of the flux lines 64 being in the clockwise direction, while the direction of the flux lines 65 is in the counter-clockwise direction around their respective loops. The flux lines have the direction through the rotor 14. The illustrated flux flow takes place in the above manner because the permanent magnets 42 and 44 are positioned within the stator with the like poles directed toward each other thus creating two magnetically equipotential levels in the laminations interconnecting the magnets. Poles 10 and 13, therefore, become the north poles for the permanent magnet material as well as for the field produced by the field windings, and poles 11 and 12 become the south poles for the same combination of fluxes produced by the permanent magnets and the field windings. Therefore, the alignment of the A—B rotor teeth with the poles 10 and 12 produces the flux flows 64 and 65, while the alignment of the rotor teeth C—D with the poles 13 and 11 produces the flux flows 66 and 67, which represents the reversal of the flux flow through the armature windings 26 and 27.

The minimum number of poles that one can have on the stator is four in order to produce the type of flux reversal described above. The number of such poles may be increased by an increment of four, thus creating a series reading as follows: 4, 8, 12, 16, etc. However, any increase in the number of poles beyond four at once creates an unfavorable geometry in the sense that less room becomes available for the field and armature windings and for placing the permanent magnets and, therefore, the most favorable stator configuration is the one having four stator poles illustrated in all the figures.

The minimum number of the rotor teeth is equal to two rotor teeth, such as rotor teeth A—B. However, although the decrease in the number of the rotor teeth diminishes the amount of a parasitic flux leakage, it also decreases the usefulness of the rotor in the sense that a lower number of flux reversals takes place per one revolution of the rotor with the concomitant loss or lowering of the rated output of the alternator. Therefore, the number of teeth on the rotor should be higher than two, and, preferably should be as high as to produce a rotor tooth the peripheral dimension of which is equal to the peripheral dimension of the stator pole with the gap between the teeth being equal to the peripheral dimension of the rotor tooth. This is the geometry illustrated in this invention, making the angle between the radial center lines of any two adjacent teeth equal to 36°. The peripheral dimension of the stator pole, therefore, is equal to the same dimension of the rotor tooth. Moreover, the stator tooth should be dimensioned so as to avoid oversaturation of the magnetic material used for the stator laminations, which is a silicon steel. The same material is used for the rotor laminations so that the permeabilities of the two materials are equal.

Before concluding the description of the rotor configuration, it follows from the above description that for a four pole stator the rotor may have the following number of teeth: 2 (minimum), 4, 6, 8, 10, etc., in the disclosed configuration, 10 being the optimum number producing an alternator having a minimum specific weight and requiring minimum angular speed of the rotor.

Figure 9:
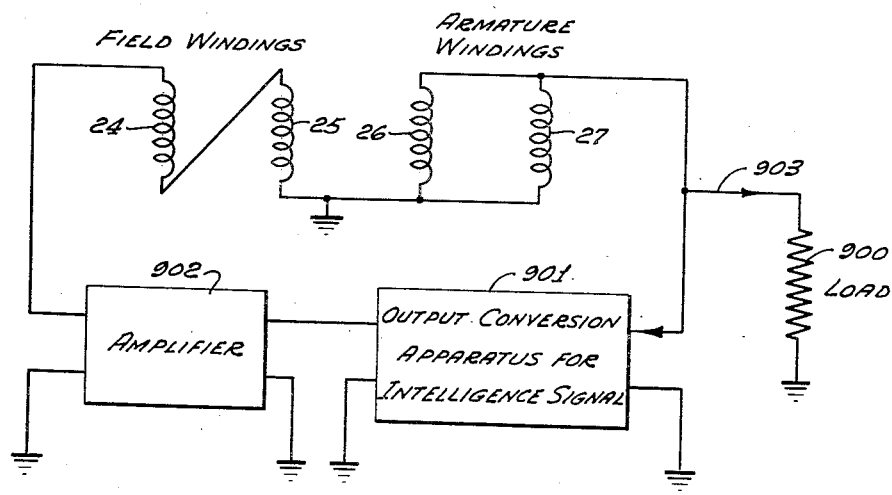
Figure 9 is a schematic diagram of the compound generator and a voltage control circuit connected between the armature windings and the field windings of the generator.

Figure 9 illustrates a schematic diagram of the generator, including a voltage control circuit. The two armature windings are connected in parallel and are grounded on one side and are connected to a load 900. Parallelly connected windings are preferred to yield minimum internal impedance of the generator. Conductor 903 is also connected to an output conversion apparatus 901 which may be a combination of a full wave rectifier and a filter. The output of the conversion apparatus is connected to a direct current amplifier 902, the output of which is connected in series with the field windings 24 and 25. The output of amplifier 902 is inversely proportional to the voltage appearing on conductor 903. Voltage regulation systems of the above type are known in the art and need no additional description. In the preferred embodiment of the circuit, amplifier 902 is a magnetic amplifier receiving its direct current intelligence signal from the conversion apparatus. A source of direct current reference voltage must be provided in such case for the magnetic amplifier. Amplifiers of the above type are known in the art and need no detailed description.

It has already been stated that the disclosed generator has a high flux modulation, high residual flux, low reluctance magnetic circuits and high sensitivity of such circuits, fast voltage build-up, and ability to control terminal voltage of the compound generator by means of fast-acting electronic circuits which control the current flowing through the field windings. An additional advantage of the generator resides in the fact that its rotor is made of silicon steel laminations and does not include any permanent magnet material. Accordingly it can be rotated at very high speeds such as 40–60,000 R. P. M. and 1260 feet per second peripheral velocity without disintegration of the rotor due to the high centrifugal forces.

In accordance with the provisions of the patent statutes, I have described the principle of operation and the preferred structure of my invention, but I desire to have it understood that the apparatus shown is only illustrative of my invention and that the invention may be carried out by other means without departing from the spirit of the invention as sought to be defined in the following claims.

I claim:

1. A compound alternating current generator comprising a multitooth ferro-magnetic rotor, a composite ferromagnetic stator core surrounding said rotor and having at least four poles projecting radially inwardly into said stator and being angularly displaced from each other by 90° around the periphery of said stator, said ferro-magnetic stator having first and second ferro-magnetic circuits mounted side-by-side with respect to each other, said first circuit including at least two permanent magnets each positioned between two poles along the periphery of said first circuit, with the like poles of said magnets being directed toward each other, at least two field coils surrounding the second ferro-magnetic circuit, one field coil being in angular alignment with one magnet and the other coil being in angular alignment with the other magnet, and at least two armature coils surrounding the remaining portions, respectively, of the first and second ferro-magnetic circuits, the teeth on said rotor being angularly positioned to close first the magnetic circuit of the two diametrically opposite poles of said stator and then the remaining two poles of said stator for producing the reversal of flux passing through said armature windings.

2. A compound alternating current generator comprising a first stack of circularly-shaped laminations having first through fourth poles angularly displaced from each other by 90°, first and second field windings surrounding said first stack and being positioned between said first and second poles, and said third and fourth poles, respectively; second and third stacks of lamination segments and poles, first and second permanent magnets magnetically interconnecting the second and the third lamination segments, respectively, with the permanent magnets being in angular alignment with said field windings, the like poles of said magnets being directed toward each other and being separated from each other by the respective lamination segment, first and second armature windings surrounding said first stack and also said second and third stacks said stacks being in direct lateral contact with each other, said first armature winding being positioned between the first and fourth poles, and said second armature winding being positioned between the second and the third pole, and a multi-tooth rotor in concentric relationship with respect to said stator and the poles of said stator, said teeth being spaced on said rotor magnetically to connect the first pole to the third pole, and the second pole to the fourth pole for reversing the flux passing through said armature windings.

3. A compound alternator comprising a first stator portion having an even number of stationary permanent magnets, the like poles of said magnets being directed toward each other, ferro-magnetic members magnetically connecting said like poles, said members having at least four poles, a second stator portion having a continuous ferro-magnetic core mounted on one side of said first stator and having a like number of poles on both stators, the poles on both stator portions having identical angular positions and transversely matching each other, at least two field windings surrounding said second stator core and being in angularly the same positions on said core as the magnets in the first stator portion, at least two armature windings surrounding said core and said ferro-magnetic members, said armature windings being disposed on the diametrically opposite portions of said core, and a ferro-magnetic rotor having an even number of teeth for magnetically connecting the diametrically opposite poles and for reversing the flux passing through said armature windings.

4. A compound generator comprising a shaft, a ferro-magnetic rotor mounted on said shaft and having ten rotor teeth, a compound stator having a continuous ferro-magnetic circuit surrounding said rotor and having first through fourth poles 90° displaced from each other around the periphery of said stator, a first permanent magnet spanning a transverse portion of the stator sector between said first and second poles, and a second permanent magnet spanning a similar transverse portion of the sector between the third and fourth poles, a continuous ferro-magnetic ring interconnecting the remaining portions of all four poles, said poles constituting an integral part of said ring, a first field winding between said first and second poles, and a second field winding between the third and fourth poles, said field winding surrounding said ring, a first armature winding between the first and fourth poles, a second armature winding between the second and third poles, said armature windings surrounding their respective portions of the entire ferro-magnetic circuit, a multi-tooth rotor, and a shaft for said rotor, said rotor, when rotated, magnetically connecting the first pole to the third pole for directing flux in the first direction from said permanent magnets and said field windings through said armature windings, and then magnetically connecting the second pole to the fourth pole for directing said flux through said armature windings in the direction opposite to said first direction.

5. A compound generator as defined in claim 4 in which each of said permanent magnets includes a copper loop surrounding said magnet for resisting demagnetization due to the armature reaction, a first non-magnetic sector for mechanically connecting said transverse portions of the first and second poles, and a second non-magnetic sector for mechanically connecting said transverse portions of the third and fourth poles.

6. A compound generator as defined in claim 4 in which said ferro-magnetic circuit includes a plurality of ring-shaped laminations with said poles having an inner portion extending radially inward into said ring and terminating in pole tips, said poles also having outer portions extending radially outward beyond the periphery of said ring.

7. A compound generator comprising a compound stator, said stator including a first permanent magnet portion and a second electro-magnetic portion, each of said first and second portions constituting a continuous, ring-shaped magnetic circuit having at least four poles, said first portion including at least two permanent magnets with like poles of said magnets directed toward each other to produce at least two magnetically equipotential energy loci, the first locus being the north pole locus, and the second locus being the south pole locus, and said second circuit including at least two field windings, said first and second portions being mounted side-by-side and having means for mechanically holding said portions in a transversely integrated relationship with respect to each other, at least two armature windings each surrounding both portions of said stator at said loci, and a multi-tooth rotor, the teeth of said rotor being spaced with respect to said poles and to said loci to produce a flux reversal in said stator in response to the rotation of said rotor by magnetically connecting first one end of the north pole locus to the diametrically opposite end of the south pole locus and then the opposite, or the other, end of the north pole locus to the diametrically opposite other end of the south pole locus.

References Cited in the file of this patent

FOREIGN PATENTS

| 325,056 | Great Britain | Feb. 13, 1930 |
| 638,576 | France | Feb. 21, 1928 |